US006963615B2

(12) United States Patent
Kawasaki et al.

(10) Patent No.: US 6,963,615 B2
(45) Date of Patent: Nov. 8, 2005

(54) PIXEL MODULATION APPARATUS AND METHOD THEREOF

(75) Inventors: Somei Kawasaki, Saitama (JP); Masami Iseki, Kanagawa (JP); Hiroyuki Maru, Kanagawa (JP); Fujio Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/117,204

(22) Filed: Apr. 8, 2002

(65) Prior Publication Data

US 2002/0150163 A1 Oct. 17, 2002

(30) Foreign Application Priority Data

Apr. 11, 2001 (JP) ....................................... 2001-113090

(51) Int. Cl.[7] .................................................. H04N 7/12

(52) U.S. Cl. .................................................. 375/240.26

(58) Field of Search ....................... 375/240.26, 240.29; 345/643, 691; 382/169; 348/671

(56) References Cited

U.S. PATENT DOCUMENTS 4,802,105 A * 1/1989 Suzuki ....................... 358/1.9
5,926,563 A * 7/1999 Yamazaki ................... 382/167
6,362,898 B1 * 3/2002 McDonald .................. 358/1.7
6,563,888 B1 * 5/2003 Toriyama .................... 375/340
6,590,461 B2 * 7/2003 Kawano ...................... 331/74
2002/0118304 A1 * 8/2002 Mandl ........................ 348/671

* cited by examiner

*Primary Examiner*—Vu Le
(74) *Attorney, Agent, or Firm*—Fitzpatrick, Cella, Harper & Scinto

(57) ABSTRACT

A pixel modulation apparatus for converting pixel data D composed of N1 bits to a pixel data signal composed of one bit. The pixel data D is input into the apparatus at a pixel period T0. The apparatus includes a first data conversion unit which converts the pixel data D to pixel data D1 expanded to N2 bits (N2>N1) at the period T0, a second data conversion unit which converts the pixel data D1 to pixel data D2 composed of N3/m bits at a period T0/m, a third data conversion unit which inputs n data from among the pixel data D2 and pixel data Dd2 constituting the pixel data D2 before having the period T0/m to execute logical sum operations a predetermined number (equal to or less than n) of times to convert the n data to pixel data D3 composed of N3 bits, including additional data corresponding to the predetermined number, and a fourth data conversion unit which converts the pixel data D3 to the pixel data signal composed of one bit at the period T0/m.

15 Claims, 16 Drawing Sheets

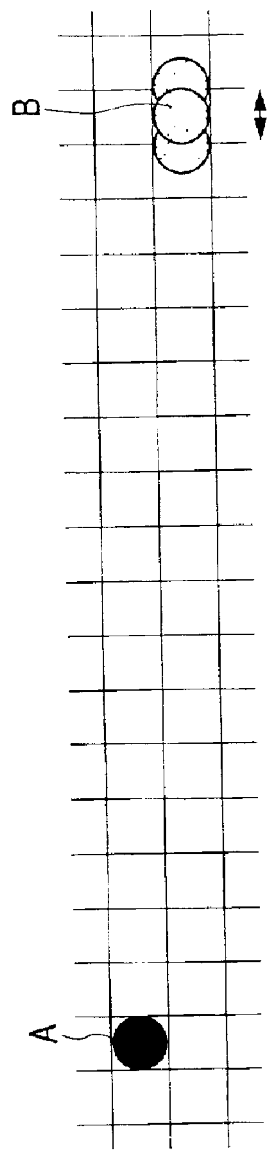
FIG. 3
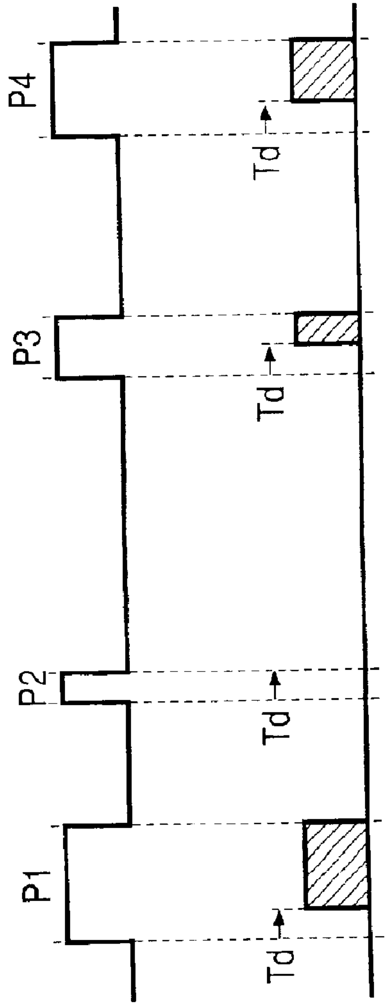
FIG. 4A
FIG. 4B

6→32 BITS DATA CONVERSION CIRCUIT
32→8 BITS DATA CONVERSION CIRCUIT
DATA CONVERSION CIRCUIT
8→1 BIT DATA CONVERSION CIRCUIT
CK1
CK2
CK3
CK4
K1
K2
D
D1
D2
D3
WK
KS
DS
LS
L
ON
1
2
3
4

To
To/4
n
n+1
n+2
n+3
n+4
n+5
z1
z2
z3
z4

| L (2 : 0) | S (7 : 1) |
|---|---|
| 0 0 0 | 0 0 0 0 0 0 0 |
| 0 0 1 | 0 0 0 0 0 0 1 |
| 0 1 0 | 0 0 0 0 0 1 1 |
| 0 1 1 | 0 0 0 0 1 1 1 |
| 1 0 0 | 0 0 0 1 1 1 1 |
| 1 0 1 | 0 0 1 1 1 1 1 |
| 1 1 0 | 0 1 1 1 1 1 1 |
| 1 1 1 | 1 1 1 1 1 1 1 |

To/4
To/32
z1
z2
z3
z4
z5
z6
z7
z8
D37—34
Dc3—Dc0
D30
D33
D34
D37
D31
D32
D35
D36
D37
D36
D35
D34
D33
D32
D31
D30

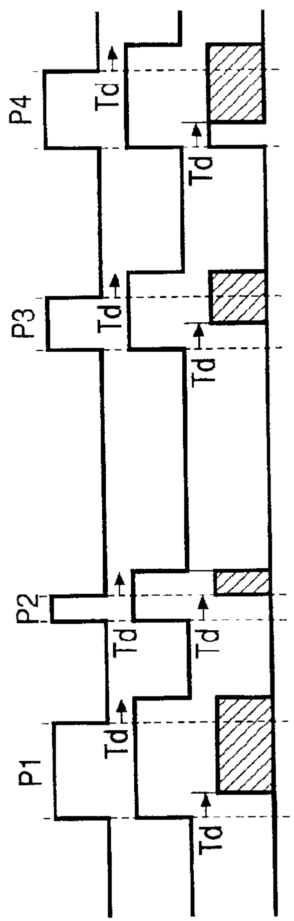
FIG. 18A
FIG. 18B
FIG. 18C
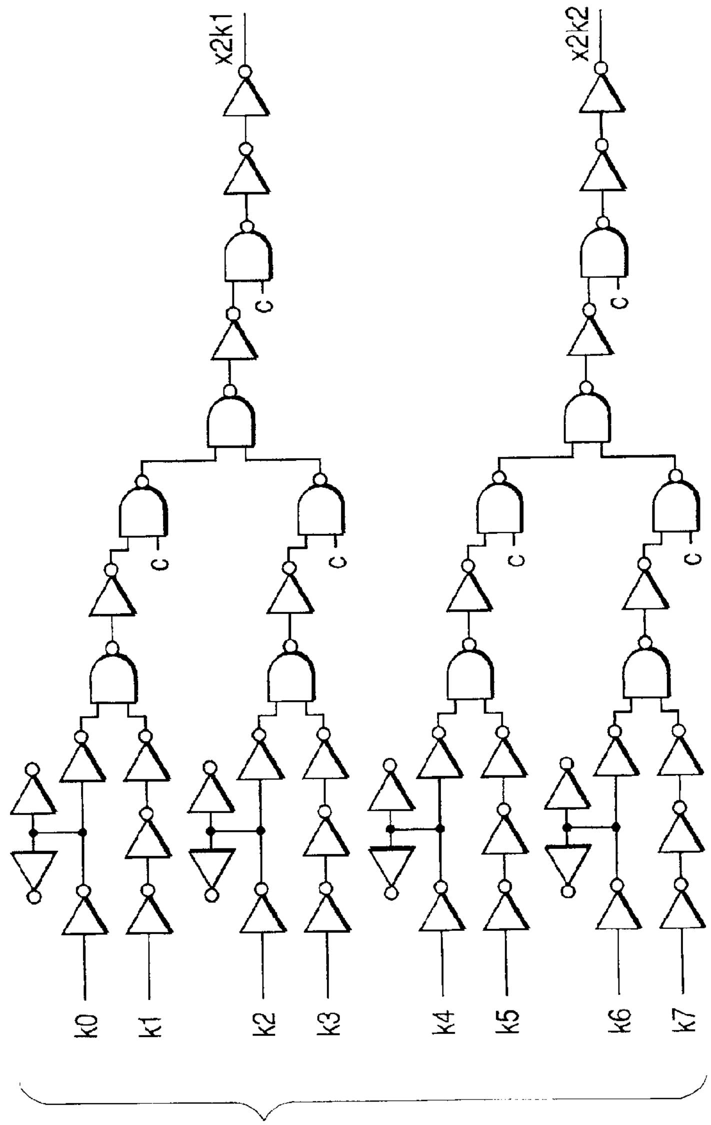
FIG. 19

PIXEL MODULATION APPARATUS AND METHOD THEREOF

BACKGROUND OF THE INVENTION

1. Field of the Invention

The present invention relates to a pixel modulation apparatus and a method thereof, and more particularly to a pixel modulation apparatus capable of performing high-accuracy pulse width modulation for controlling the light emission of a laser on a pixel basis in an image forming apparatus which uses the laser to form an image, and a method of such pixel modulation.

2. Related Background Art

An image forming apparatus using a laser beam has been used as one of apparatus performing the control of the quantity of a laser beam by means of a pulse width modulation. As for such an image forming apparatus, first, a color image forming apparatus is simply described as an example thereof.

A color image forming process of such an color image forming apparatus generally uses four kinds of toners of yellow (Y), cyan (C), magenta (Mg) and black (Bk) severally. Such a color image forming process takes a time four times as long as the time necessary for an image forming process of a conventional image forming apparatus forming a monochrome image if no measures for shortening the time are taken. Because of this, an image forming process adopts use of four photosensitive drums for the respective four colors and use of a two-beam laser capable of writing two lines at the same time.

FIG. 1 is a schematic diagram of a conventional four-drum type image forming apparatus. In the apparatus, photosensitive drums 18*a*, 18*b*, 18*c* and 18*d* are disposed in a line. A different color is allotted to each of the photosensitive drums 18*a*–18*d*. The toner of each color is sequentially transferred to a photographic printing paper 26, and a color image is reproduced on the photographic printing paper 26. Each of the photosensitive drums 18*a*–18*d* is provided with an image writing portion shown in FIG. 2. The image writing portion forms an electrostatic latent image on the photosensitive drum by means of a laser beam. The operations of the image writing portion shown in FIG. 2 are described in the following.

DESCRIPTIONS OF IMAGE WRITING PORTION

A laser chip 21 is one of a two-beam type having laser diodes a and b. The laser chip 21 also has a photodiode c receiving the back light from each of the laser diodes a and b.

Driving currents Id1 and Id2 for controlling the emission of light of each of the laser diodes b and a, respectively, are supplied to the laser diodes a and b from a laser diode (LD) driver 22. The photodiode c outputs monitor current Im according to the quantity of the back light. The monitor current Im is input into the LD driver 22. The LD driver 22 performs the auto-power control (APC) of the quantities of the light emitted by the laser diodes a and b on the basis of the monitor current Im. The interval between the laser emission points of the laser chip 21 cannot be equal to the interval between pixels (about 42 $\mu$m in case of 600 dots per inch (dpi)) owing to the limitation on the manufacture of the laser chip 21. Because of this problem, as shown in FIG. 3, the laser diodes a and b are obliquely disposed such that two beams A and B are spotted at positions distant from each other by, for example, 16 pixels in the laser scanning direction in pixel regions enclosed by grid lines.

Laser beams emitted by the laser chip 21 are deflected by a polygon mirror 16 fixed on a motor shaft to rotate in the direction shown by an arrow in FIG. 2. Thereby, the deflected laser beams scan on a photosensitive drum 18. A f-θ lens 17 is for collecting the deflected laser beams on the photosensitive drum 18 such that their linear velocities are constant. If the photosensitive drum 18 and the toner for printing are previously charged electrostatically by the predetermined quantities of electrostatic charges, the quantity of the toner for printing adhering to the photosensitive drum 18 changes according to the quantity of the light irradiating the photosensitive drum 18. Consequently, it becomes possible to print an image having intermediate gradations. A BD mirror 19 is disposed at a position in a mechanically fixed positional relation to the photosensitive drum 18. Laser beams reflected by the BD mirror 19 are input into a light receiving diode 20. The received laser beams are used for the detection of the positions on the photosensitive drum 18, from which information is written. An output of the light receiving diode 20 is input into a horizontal synchronizing signal generating circuit 24, and the horizontal synchronizing signal generating circuit 24 generates a horizontal synchronizing signal BD.

The horizontal synchronizing signal BD is input into a pixel modulation circuit 23. The pixel modulation circuit 23 generates a pixel clock synchronized with the horizontal synchronizing signal BD or a pixel clock having a frequency which is a coefficient multiple of the frequency of the horizontal synchronizing signal. Read clocks RK1 and RK2 for the reading of pixel data are input into a pixel data generating unit 25 on the basis of the pixel clock.

The pixel data generating unit 25 outputs pixel data D1 and D2 and respective write clocks WK1 and WK2 to the pixel modulation circuit 23. The pixel data generating unit 25 generates the pixel data D1 and D2 by reading an original with a scanner or the like. The pixel modulation circuit 23 outputs pixel modulation signals ON1 and ON2 for making it possible to modulate the quantity of laser light desirably, to the LD driver 22 on the basis of the pixel data D1 and D2. The pixel modulation signals ON1 and ON2 are pulse width modulation signals for controlling the quantity of laser light on the basis of the periods of laser irradiation time. FIG. 4A shows an example of a pixel modulation signal taking different pulse widths P1, P2, P3 and P4. If a laser diode is turned on in accordance with these pulse widths P1–P4, the desired control of quantity of light to the photosensitive drum 18 can be realized. There are two major methods of pixel modulation, which are applicable to the pixel modulation circuit 23.

Digital Pixel Modulation

A pixel modulation circuit for the use of a character image adopts the serial modulation of, for example, four bits to process a pixel (composed of e.g. 600 dpi) by dividing the pixel into four pixels (composed of 2400 dpi). Dithering and the error diffusion method are used jointly to improve reproducibility of the gradation of a video image.

Analog Image Modulation

It is general that a pixel modulation circuit needed to reproduce a further higher image quality is provided with a triangular wave signal generation circuit for generating an analog pixel data signal by converting input pixel data D1 and D2 by digital-analogue (D/A) conversion to generate a triangular wave signal having a predetermined pixel period, and a pulse width modulation circuit for generating a pulse width modulation signal by comparing the signal level of the triangular wave signal and the signal level of the aforementioned analog pixel data signal.

However, the digital pixel modulation and the analog pixel modulation, which are used in the conventional image forming apparatus, have the following problems.

Problem 1.

Input images generally have characters and video images that are mixed together. For such input images, the conventional digital pixel modulation could not secure sufficient number of pixel divisions, and thereby, a predetermined video image quality could not be secured.

Problem 2.

In the conventional analog pixel modulation, because a stable fast triangular wave signal generation circuit cannot be realized by the complementary metal-oxide semiconductor (CMOS) large scale integrated circuit (LSI) technique, the stable fast triangular wave signal generation circuit has been realized by the bipolar LSI technique. Consequently, a pixel modulation circuit for video has been expensive.

Problem 3.

FIG. 4A shows an example of a pixel modulation signal including different pulse widths P1–P4. If the laser diodes a and b are lightened in accordance with the pulse widths, a desired control of the quantity of light on the photosensitive drum 18 can be realized. However, laser diodes do not emit light immediately after the supply of a driving current Id to them, but emit light after the passing of a delay time Td in principle. On the other hand, when the driving current Id is cut off, the laser diodes stops their light emission in a short time. Consequently, as shown in FIG. 4B, the periods of light emission of the laser diodes become shorter than the periods of being on of the pixel modulation signal by the delay time Td of light emission. The laser diodes do not emit light during the period of the pulse width P2. Consequently, the desired control of the light emission of laser diodes could not performed in the conventional digital image modulation, and thereby the quality of printing has been deteriorated.

SUMMARY OF THE INVENTION

In view of the back ground mentioned above, an object of the present invention is to provide a pixel modulation apparatus that can easily generate a laser control signal suitable for various images such as gradated images and character images and can accurately change the quantity of laser light and further can be constructed by, for example, a pure CMOS process and still further is low in cost, and a method thereof.

Accordingly, according to a preferable embodiment of the invention, a pixel modulation apparatus for converting pixel data D composed of N1 bits input at a pixel period T0, to a pixel data signal composed of one bit comprising: a first data conversion unit which converts the pixel data D to pixel data D1 expanded to N2 bits (N2>N1) at the period T0; a second data conversion unit which converts the pixel data D1 to pixel data D2 composed of N3/m bits at a period T0/m; a third data conversion unit which inputs n data from among the pixel data D2 and pixel data Dd2 constituting the pixel data D2 preceding by the period T0/m to execute logical sum operations a predetermined number (equal to or less than n) of times to convert the input n data to pixel data D3 composed of N3 bits including additional data corresponding to the predetermined number; and a fourth data conversion unit which converts the pixel data D3 to the pixel data signal composed of one bit at the period T0/m.

Moreover, a pixel modulation method according to an another preferable embodiment of the invention, of converting pixel data D composed of N1 bits input at a pixel period T0, to a pixel data signal composed of one bit, comprising: a first data conversion step of converting the pixel data D to pixel data D1 expanded to N2 bits (N2>N1) at the period T0; a second data conversion step of converting the pixel data D1 to pixel data D2 composed of N3/m bits at a period T0/m; a third data conversion step of inputting n data from among the pixel data D2 and pixel data Dd2 constituting the pixel data D2 preceding by the period T0/m to execute logical sum operations a predetermined number (equal to or less than n) of times to convert the input n data to pixel data D3 composed of N3 bits, including additional data corresponding to the predetermined number; and a fourth data conversion step of converting the pixel data D3 to the pixel data signal composed of one bit at the period T0/m.

Other objects, features and advantages of he invention will become apparent from the following detailed description taken in conjunction with the accompanying drawings.

BRIEF DESCRIPTION OF THE DRAWINGS

FIG. 3 is a diagram for illustrating the disposition relation between two laser diodes;

FIG. 4A and FIG. 4B are timing charts for illustrating the operation of a conventional pixel modulation circuit;

FIGS. 18A, 18B and 18C are timing charts showing the operation of the pixel modulation circuit according to the present invention; and FIG. 19 is a diagram showing a high precision twofold multiplied clock generating circuit to be used in the data conversion circuit 4.

DESCRIPTION OF THE PREFERRED EMBODIMENTS

Figure 1:
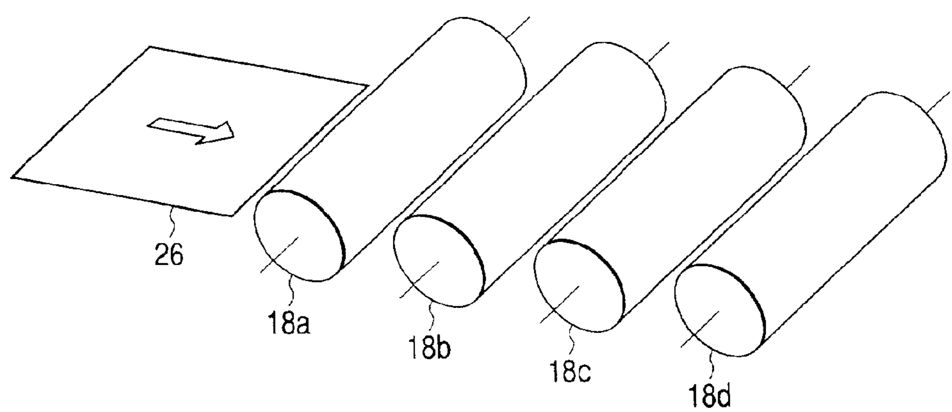
FIG. 1 is a schematic diagram of a conventional four-drum type image forming apparatus.
Figure 2:
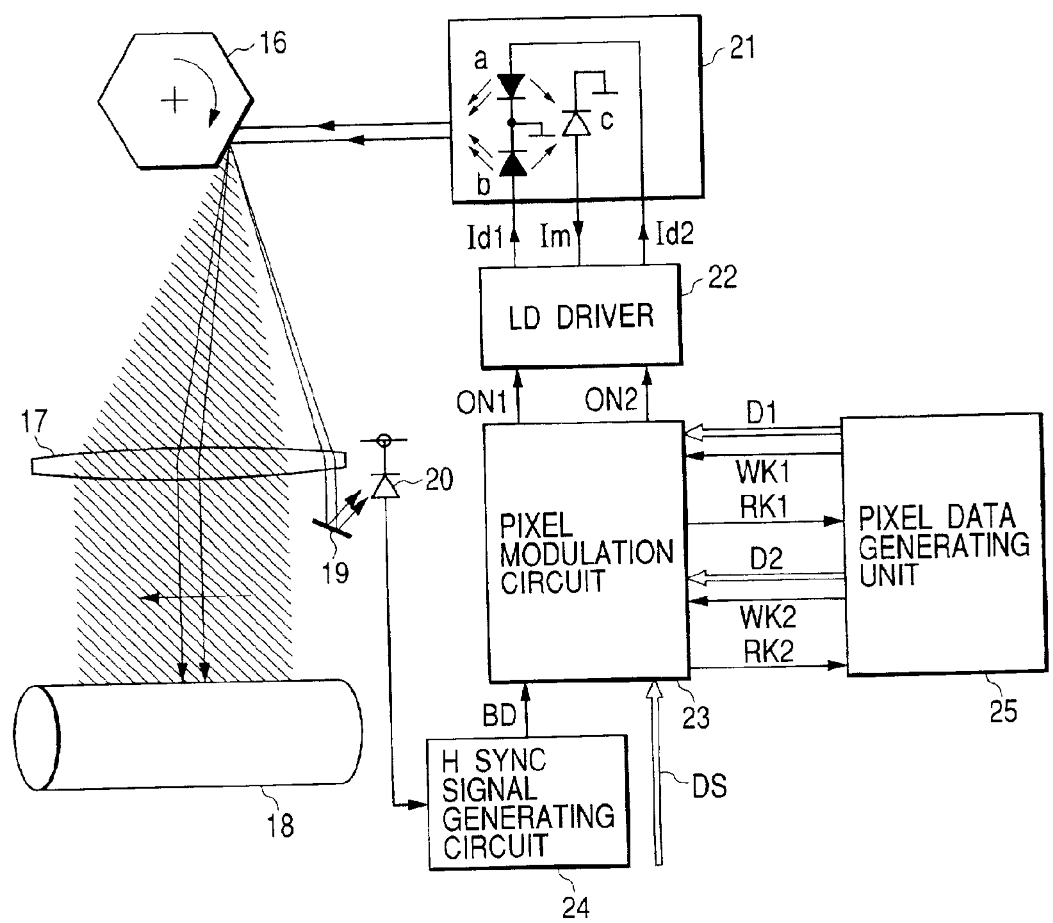
FIG. 2 is a block diagram showing the configuration of the image writing portion of the image forming apparatus.
Figure 5:
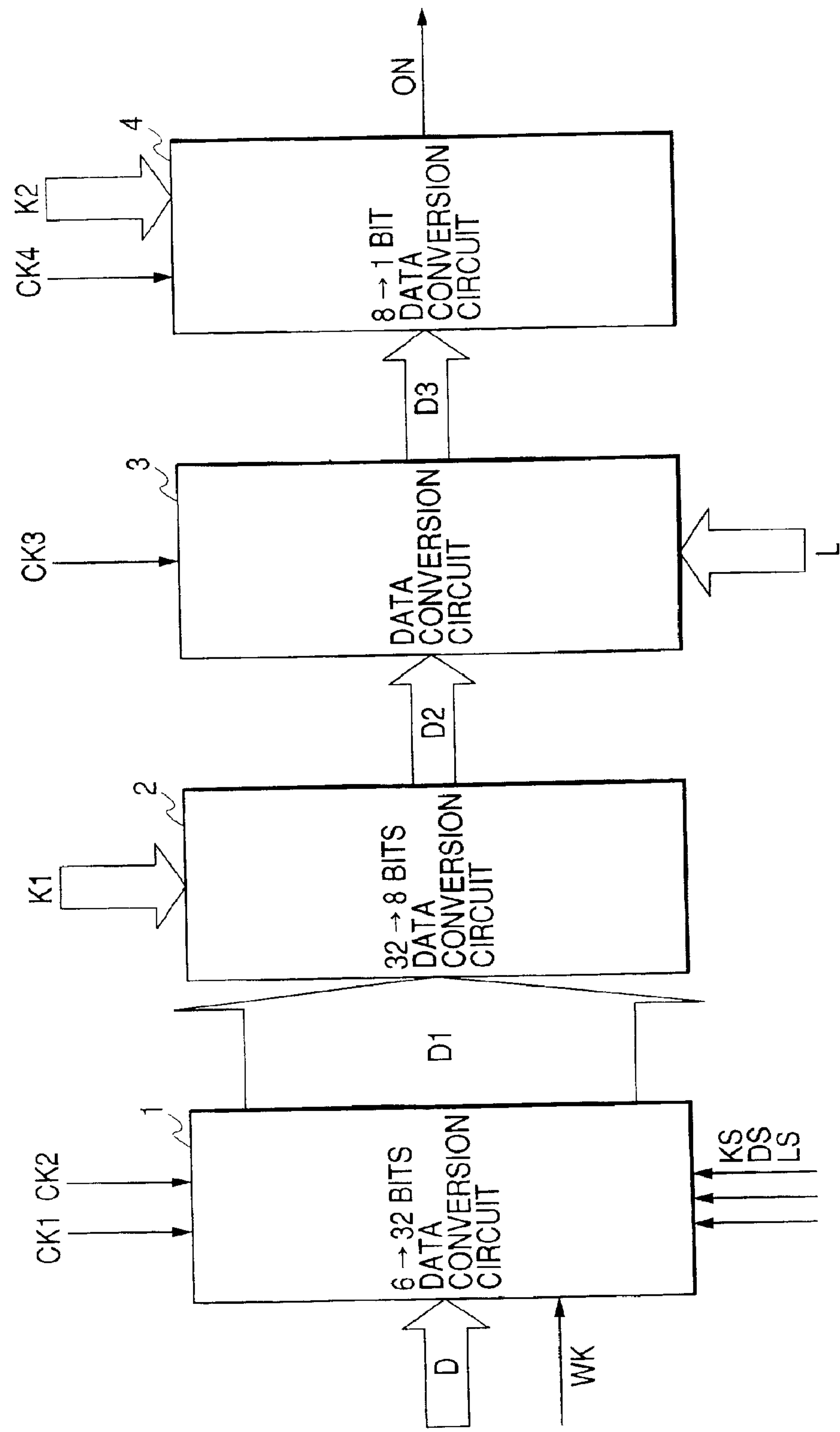
FIG. 5 is a block diagram of a pixel modulation circuit according to the present invention.

FIG. 5 shows a pixel modulation circuit according to the present invention applied to a color printer using four color pieces of toner of yellow (Y), cyan (Cy), magenta (Mg) and black (Bk). The pixel modulation circuit is composed of four data conversion circuits 1–4. The pixel modulation circuit is provided for each laser beam. The other configuration of the image writing portion provided with the pixel modulation circuit is the same as that shown in FIG. 2.

Description of Data Conversion Circuit 1

Each of pixel data D (composed of six bits in this case) generated by picking up an object image with a scanner or the like and a write clock WK are input into a 6-to-32-bit data conversion circuit 1 for converting 6 bit data to 32 bit data. Then, the pixel data D are converted to 32 bit data D1.

The 6-to-32-bit data conversion circuit 1 is, for example, a 64-word random access memory (RAM). One word is composed of 32 bits. The pixel data D are input to the address lines of the RAM, and the pixel data D1 are output from the word lines of the RAM as data D131 to D100 synchronized with read clocks CK1 and CK2. The pixel data D is previously written into each of desired word data in the RAM by use of serial transfer lines including serial transferring clocks KS, transferring serial data DS and transferring data load signals LS. It is needless to say that the data conversion circuit 1 may be a read only memory (ROM) in which the contents have previously been written fixedly.

Description of Data Conversion Circuit 2

The pixel data D1 are input into a 32-to-8-bit data conversion circuit 2. The input pixel data D1 is serially converted to 8-bit image data D2 by means of input clocks K1.

Figure 6:
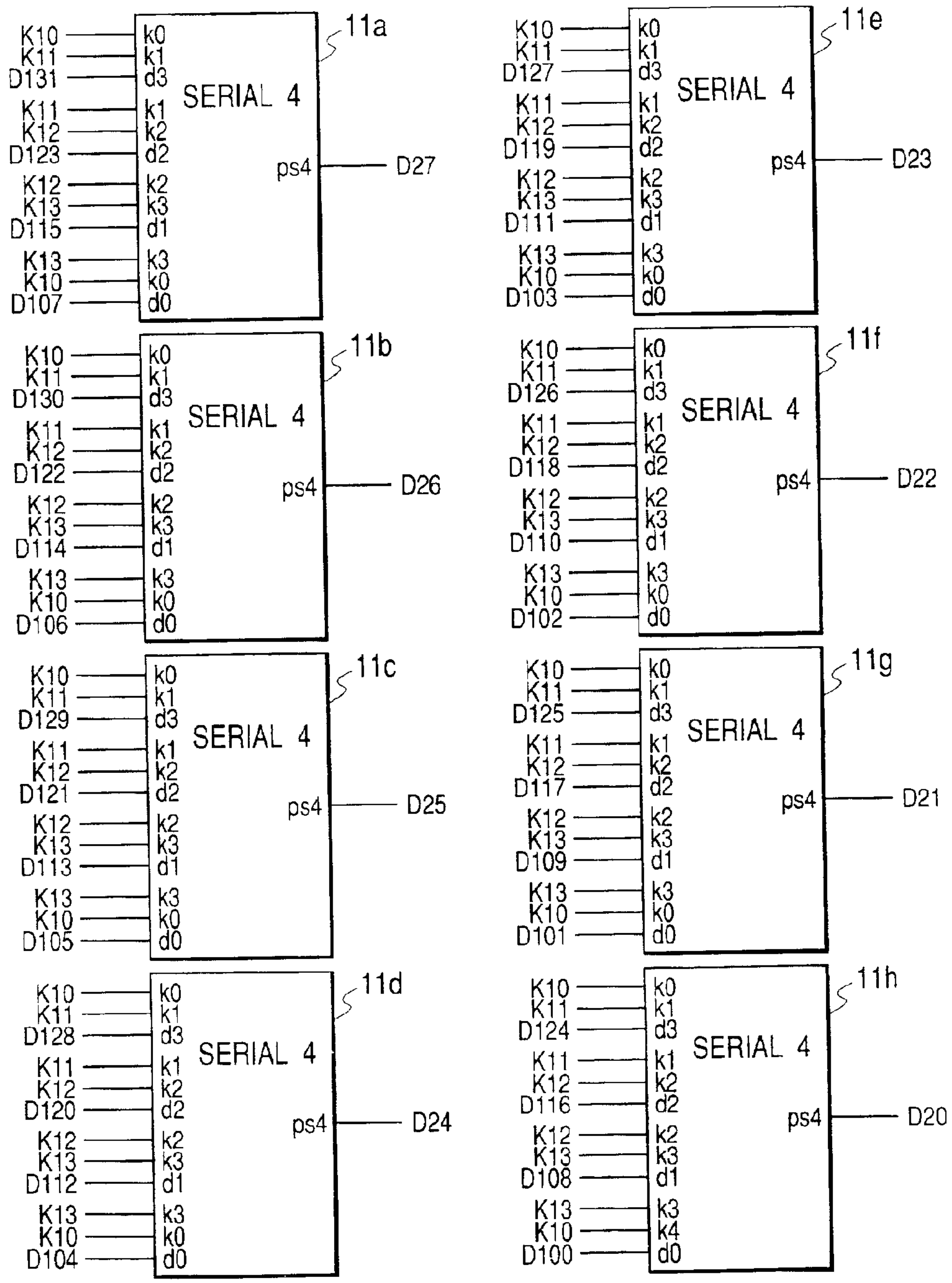
FIG. 6 is a block diagram of the data conversion circuit 2 shown in FIG. 5.
Figure 7:
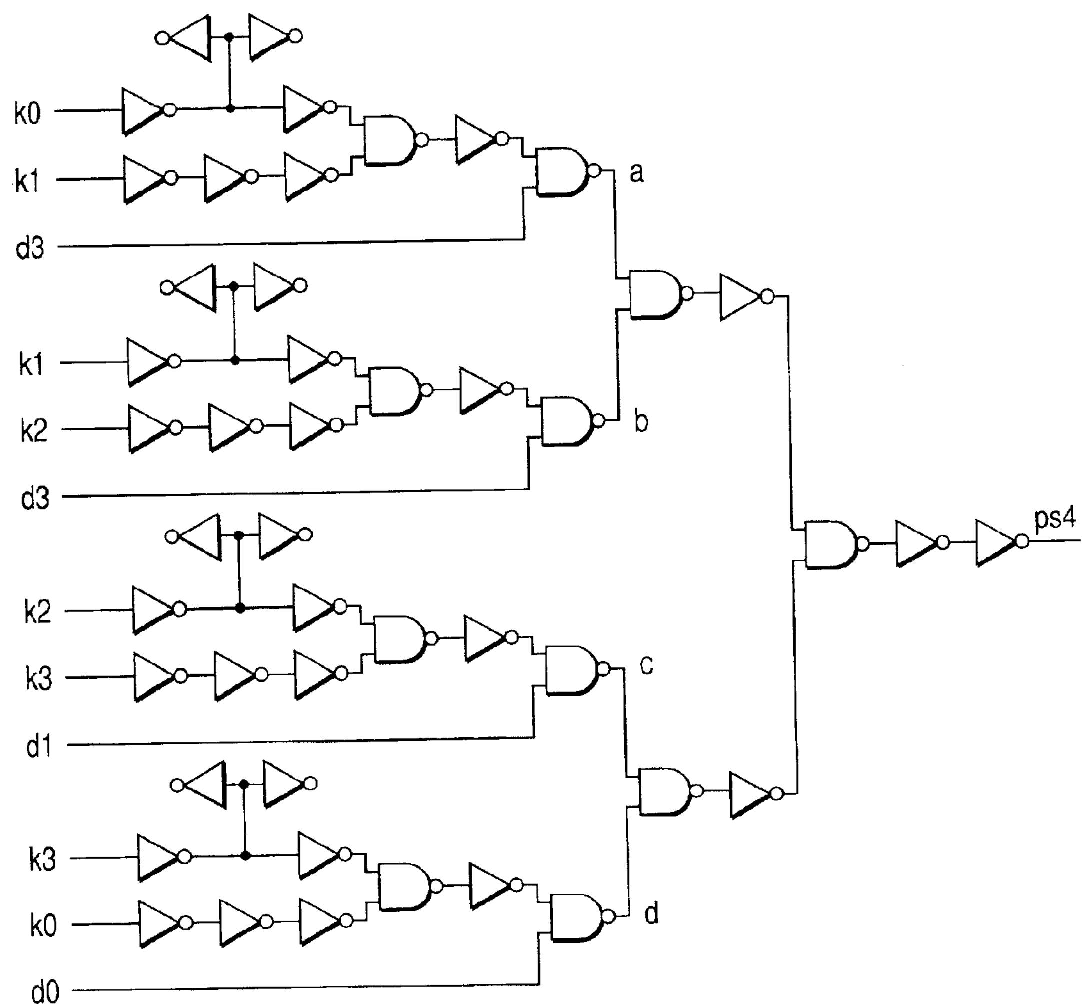
FIG. 7 is a block diagram of a high precision four-bit serial conversion circuit to be used in the data conversion circuits 2 and 4.

As shown in FIG. 6, the data conversion circuit 2 is composed of eight 4-bit serial conversion circuits 11_a_, 11_b_, 11_c_, 11_d_, 11_e_, 11_f_, 11_g_ and 11_h_. It is desirable to use the 4-bit serial conversion circuit that is shown in FIG. 7 and is composed of only inverters and two-input inverters, both being suitable for high speed operation.

Figures 8A, 8B, 8C, 8D, 8E, 8F, 8G, 8H, 8I:
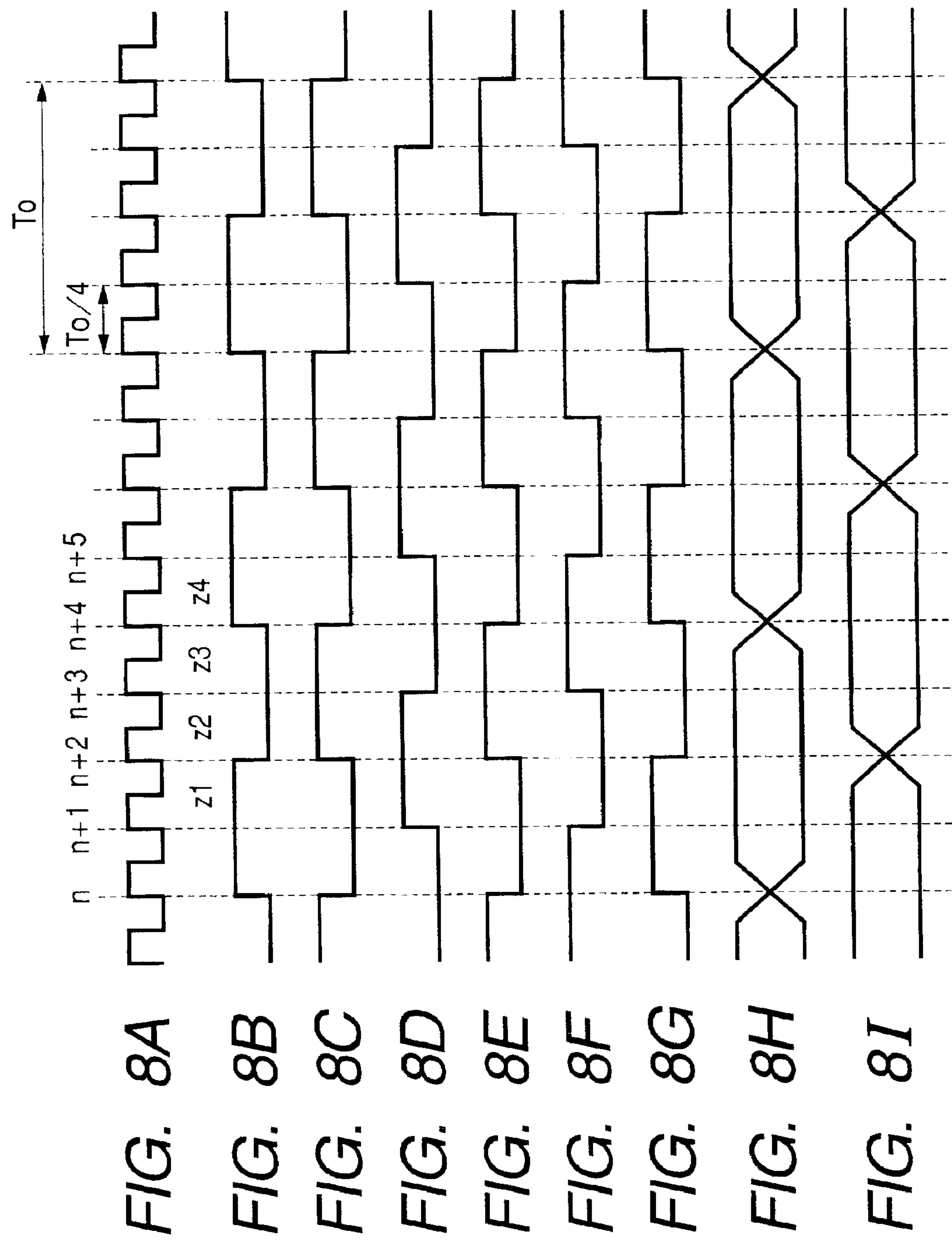
FIGS. 8A, 8B, 8C, 8D, 8E, 8F, 8G, 8H and 8I are timing charts for illustrating the operation of the data conversion circuit 2.

As clock inputs k0, k1, k2 and k3, four-phase clocks K10, K11, K12 and K13, which are respectively shown in FIGS. 8D to 8G and are obtained by the dividing of a clock signal having the period of T0/4 (T0 indicates a pixel period) shown in FIG. 8A into a frequency of one fourth of the frequency of the clock signal shown in FIG. 8A, are respectively input. The clock signal having the period of T0/4 can easily be generated by means of a phase-locked loop (PLL) circuit.

Data d3 are output to a serial data output ps4 terminal in a region z1 shown in FIGS. 8A–8I by the clock inputs k0 and k1. Data d2 are output to a serial data output ps4 terminal in a region z2 by the clock inputs k1 and k2. Data d1 are output to a serial data output ps4 terminal in a region z3 by the clock inputs k2 and k3. Data d0 are output to a serial data output ps4 terminal in a region z4 by the clock inputs k3 and k0. Thereby the four-bit seal conversions of input data d3 to d0 are realized.

As shown in FIG. 6, as the input data d3 to d0 of the serial conversion circuits 11_a_–11_h_, the following data are respectively input. As for the uppermost bit pixel data D27, data D131, D123, D115 and D107 are input. As for pixel data D26, data D130, D122, D114 and D106 are input. As for pixel data D25, data D129, D121, D113 and D105 are input. As for pixel data D24, data D128, D120, D112 and D104 are input. As for pixel data D23, data D127, D119, D111 and D103 are input. As for pixel data D22, data D126, D118, D110 and D102 are input. As for pixel data D21, data D125, D117, D109 and D101 are input. As for pixel data D20, data D124, D116, D108 and D100 are input.

Incidentally, for the ensuring of the operation of data conversion circuit 2, it is desirable to generate the high order input data D131–D116 of pixel data D1 as shown in FIG. 8H by means of the clock CK1 shown in FIG. 8B, and to generate the low order input data D115 to D100 of the pixel data D1 as shown in FIG. 8I by means of the clock CK2 shown in FIG. 8C. Thereby, the operation of the data conversion circuit 2 is stabilized.

Figures 9A, 9B, 9C, 9D:
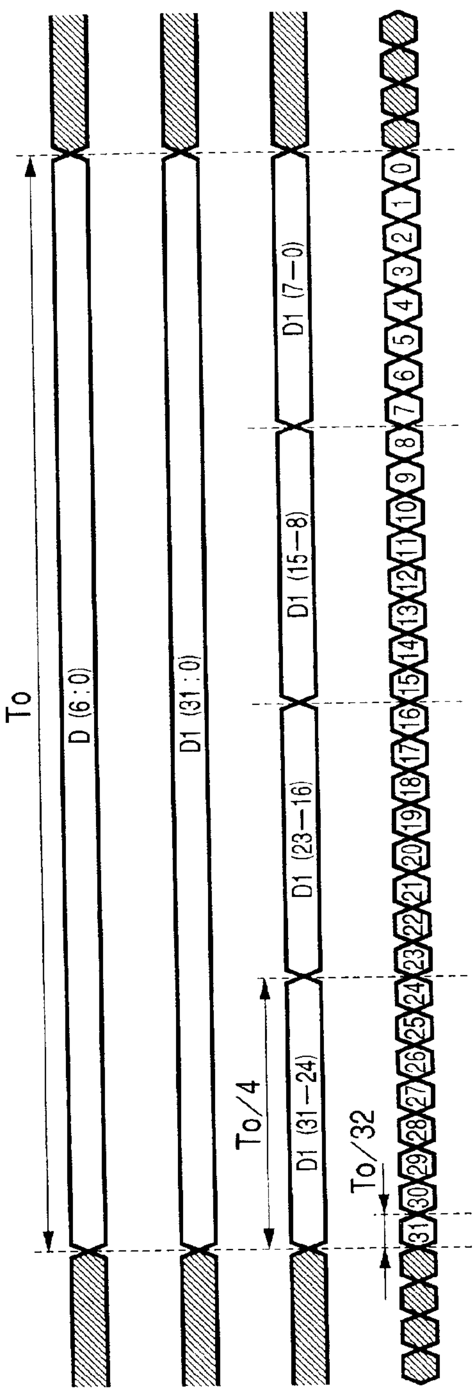
FIGS. 9A, 9B, 9C and 9D are timing charts for illustrating the operation of the pixel modulation apparatus according to the present invention.

FIGS. 9A to 9D are referred to while the data conversion operation mentioned above is described. The input 6-bit pixel data D having the period T0 shown in FIG. 9A are expanded to the 32-bit pixel data D1 having the period T0 shown in FIG. 9B. The 32-bit pixel data D1 are then converted to the 8-bit pixel data D2 having the period T0/4 as shown in FIG. 9C.

Description of Data Conversion Circuit 3

Figure 10:
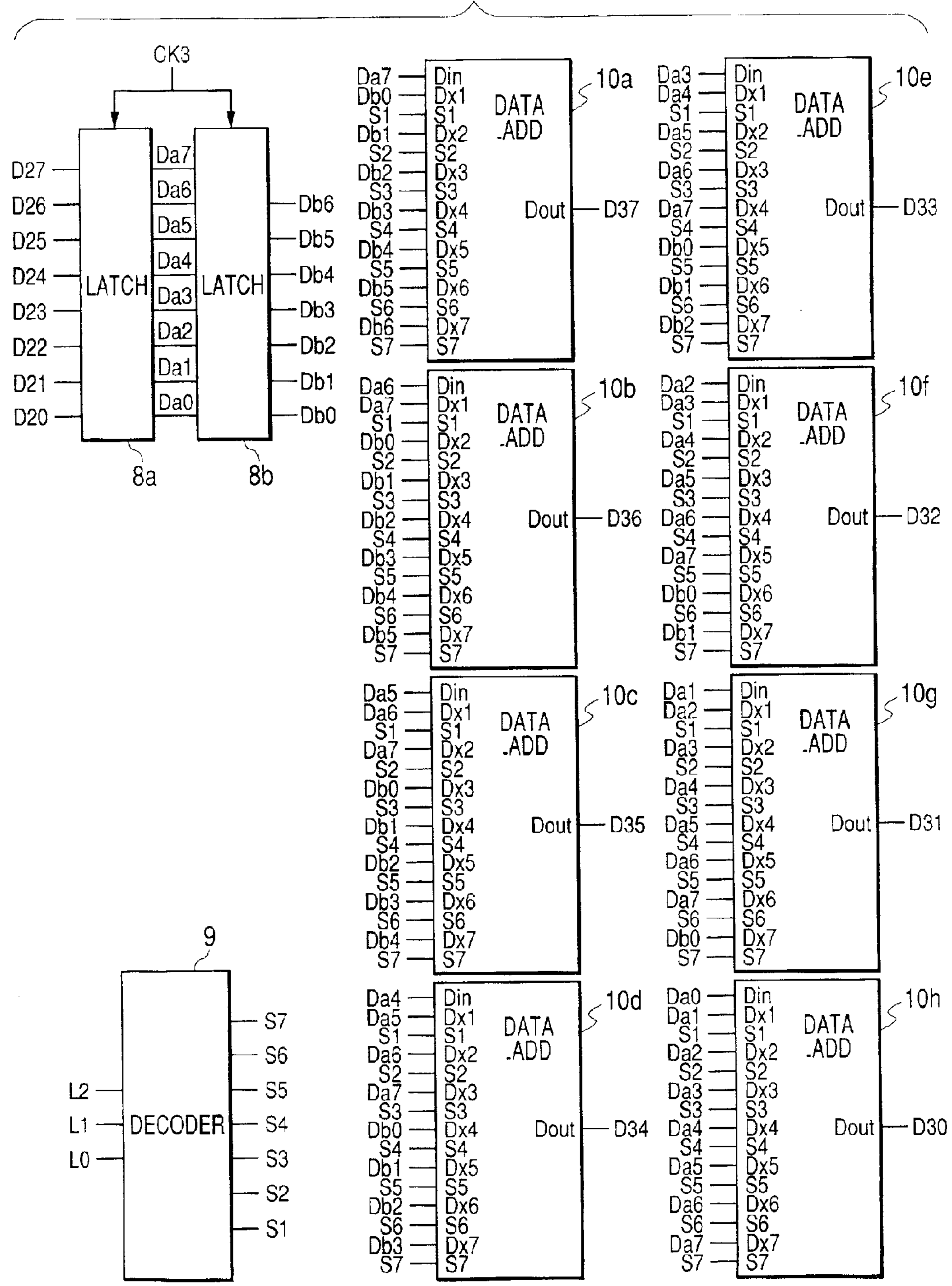
FIG. 10 is a block diagram of the data conversion circuit 3 shown in FIG. 5.

The pixel data D27 to D20 are input into the data conversion circuit 3. The configuration of the data conversion circuit 3 is shown in FIG. 10. In FIG. 10, the pixel data D27 to D20 are latched by latch circuits 8_a_ and 8_b_ by use of a clock CK3 having the period T0/4 and a predetermined phase to generate pixel data Da7, Da6, Da5, Da4, Da3, Da2, Da1 and Da0, and Db6, Db5, Db4, Db3, Db2, Db1 and Db0 delayed from the pixel data Da7 to Da0, respectively. The pixel data Da7 to Da0 and Db6 to Db0 are input into eight data adding circuit 10_a_, 10_b_, 10_c_, 10_d_, 10_e_, 10_f_, 10_g_ and 10_h_ having the same structure severally. The data adding circuits 10_a_ to 10_h_ respectively output converted pixel data D37, D36, D35, D34, D33, D32, D31 and D30. Moreover, control signals s1, s2, s3, s4, s5, s6 and s7 are input to each of the data adding circuit 10_a_ to 10_h_. The control signals s1 to s7 are generated by a decoder 9 to which pulse width adding data L2, L1 and L0 are input.

Figures 11, 12:
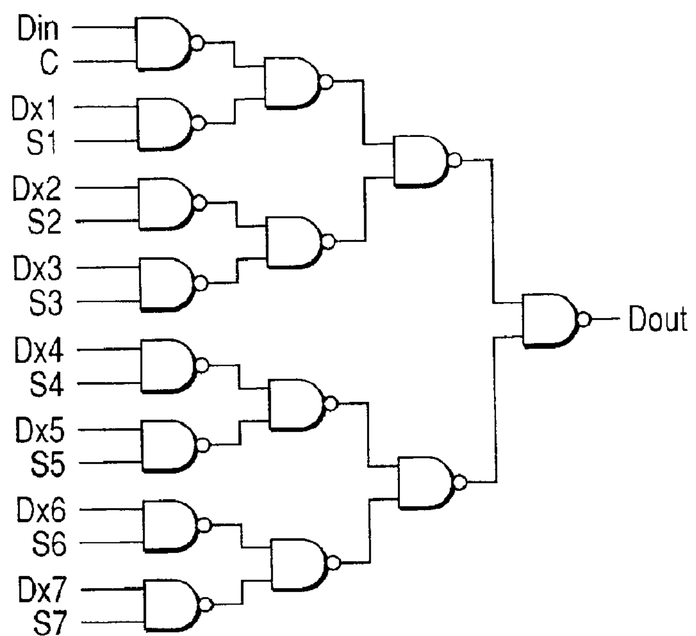
FIG. 11 is a diagram showing a data adding circuit to be used in the data conversion circuit 3.
FIG. 12 is a truth table of a decoder circuit to be used in the data conversion circuit 3.

The data adding circuits 10_a_ to 10_h_ are severally configured as an OR circuit of eight data Din, Dx1, Dx2, Dx3, Dx4, Dx5, Dx6 and Dx7, as shown in FIG. 11. Incidentally, because the other input terminal of a two-input NAND circuit to which the data Din is input is connected with a power supply C, the data Din is always output. The OR operation of the data Din with the other data Dx1 to Dx7 is executed when the control signals s1 to s7 take an H level, respectively. Then, data Dout is output.

In the data adding circuit 10_h_, the pixel data Da0, Da1, Da2, Da3, Da4, Da5, Da6 and Da7 are input as the data Din, Dx1, Dx2, Dx3, Dx4, Dx5, Dx6 and Dx7, respectively, and the converted pixel data D30 is output.

In the data adding circuit 10_g_ the pixel data Da1, Da2, Da3, Da4, Da5, Da6, Da7 and Db0 are input as the data Din, Dx1, Dx2, Dx3, Dx4, Dx5, Dx6 and Dx7, respectively, and the converted pixel data D31 is output.

In the data adding circuit 10_f_, the pixel data Da2, Da3, Da4, Da5, Da6, Da7, Db0 and Db1 are input as the data Din, Dx1, Dx2, Dx3, Dx4, Dx5, Dx6 and Dx7, respectively, and the converted pixel data D32 is output.

In the data adding circuit 10_e_, the pixel data Da3, Da4, Da5, Da6, Da7, Dab0, Db1 and Db2 are input as the data Din, Dx1, Dx2, Dx3, Dx4, Dx5, Dx6 and Dx7, respectively, and the converted pixel data D33 is output.

In the data adding circuit 10_d_, the pixel data Da4, Da5, Da6, Da7, Db0, Db1, D62 and Db3 are input as the data Din, Dx1, Dx2, Dx3, Dx4, Dx5, Dx6 and Dx7, respectively, and the converted pixel data D34 is output.

In the data adding circuit 10_c_, the pixel data Da5, Da6, Da7, Db0, Db1, Db2, Db3 and Db4 are input as the data Din, Dx1, Dx2, Dx3, Dx4, Dx5, Dx6 and Dx7, respectively, and the converted pixel data D35 is output.

In the data adding circuit 10*b*, the pixel data Da6, Da7, Db0, Db1, Db2, Db3, Db4 and Db5 are input as the data Din, Dx1, Dx2, Dx3, Dx4, Dx5, Dx6 and Dx7, respectively, and the converted pixel data D36 is output.

In the data adding circuit 10*a*, the pixel data Da7, Db0, Db1, Db2, Db3, Db4, Db5 and Db6 are input as the data Din, Dx1, Dx2, Dx3, Dx4, Dx5, Dx6 and Dx7, respectively, and the converted pixel data D37 is output.

FIG. 12 shows an example of a logical truth table for the generation of the control signals s1 to s7 on the basis of the pulse width adding data L2 to L0. On such a truth table, the data adding circuits 10*a* to 10*h* add the data Dx1 to Dx7 logically as the value of the pulse width adding data L increases. When the value of the pulse width adding data L is zero, the data conversion circuit 3 outputs the pixel data D2 as they are as pixel data D3. The following is each logical expression of the control signals s1 to s7.

$$S1=L2+L1+L0$$

$$S2=L2+L1$$

$$S3=L2+(L1\overline{+}L0)$$

$$S4=L2$$

$$S5=L2\times(L1\overline{\times}L0)$$

$$S6=L2\times L1$$

$$S7=L2\times L1\times L0$$

Figure 13:
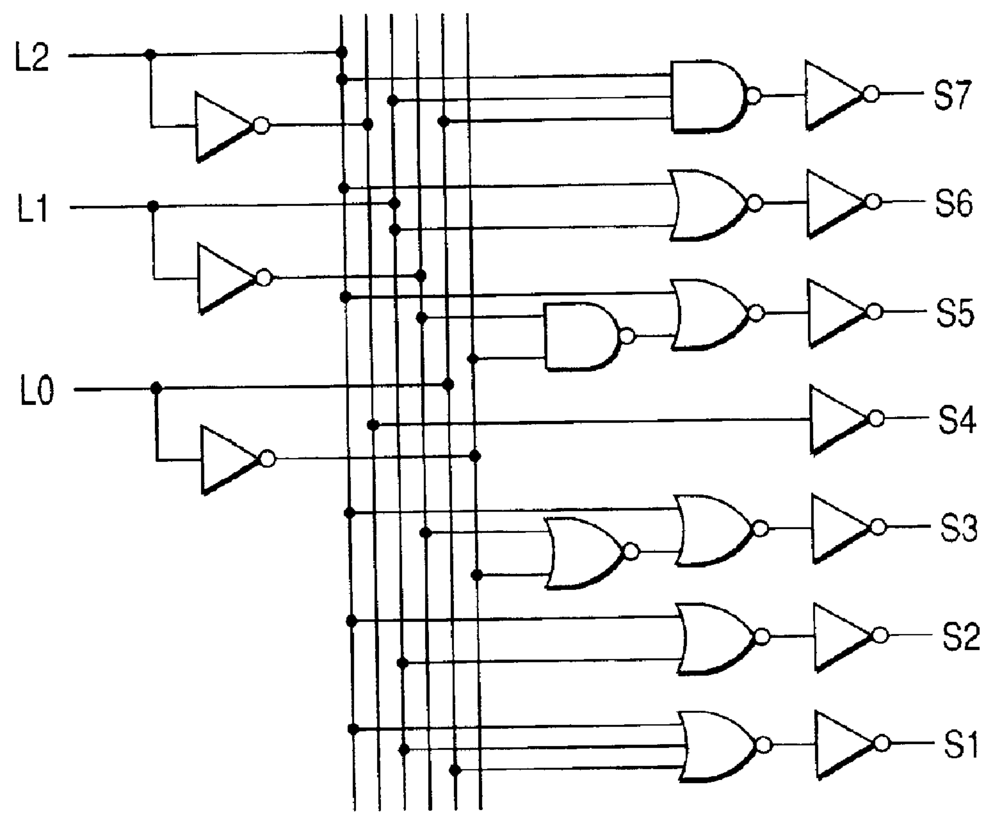
FIG. 13 is a diagram showing the decoder circuit to be used in the data conversion circuit 3.

FIG. 13 shows a circuit configuration of the decoder 9 of each logical expression.

Description of Data Conversion Circuit 4

Figure 14:
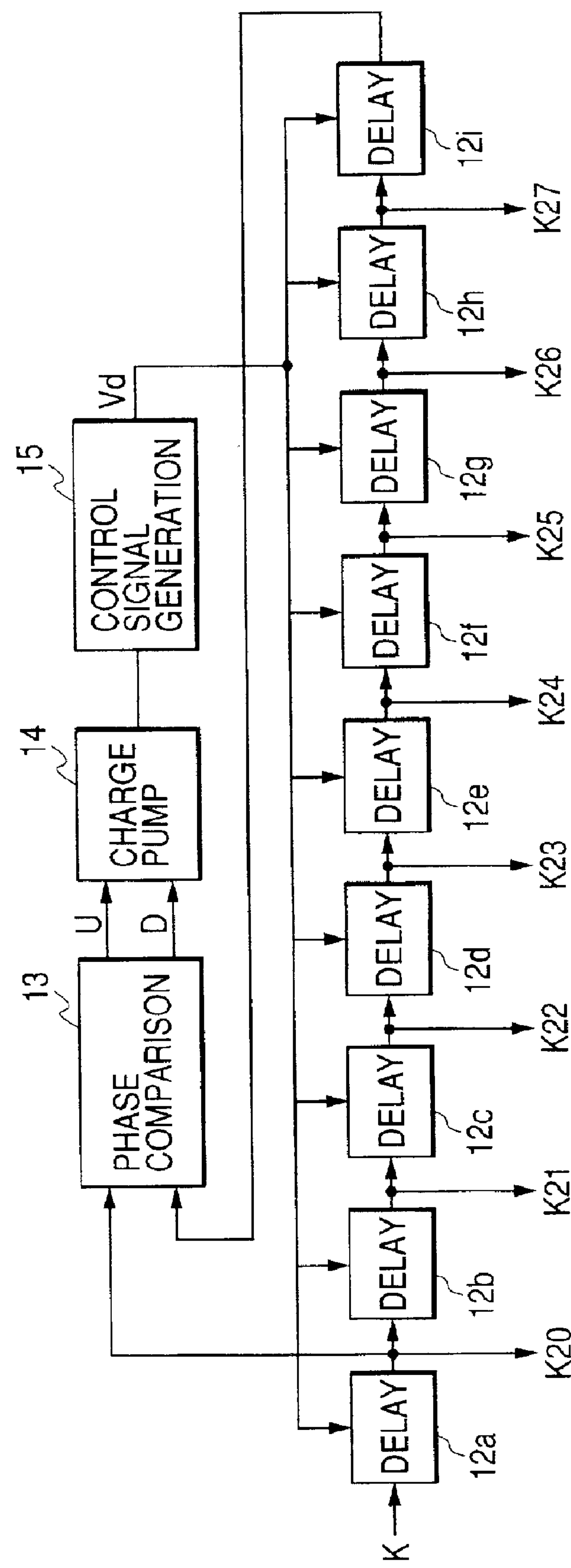
FIG. 14 is a diagram showing a DLL circuit to be used in the pixel modulation apparatus.
Figure 15:
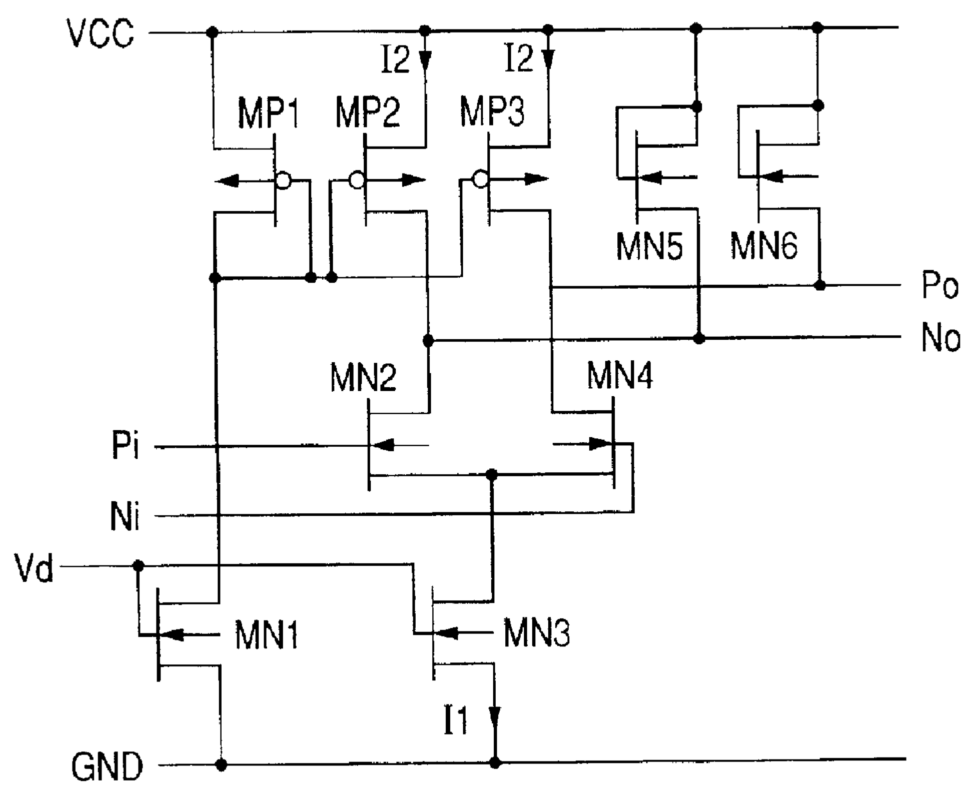
FIG. 15 is a diagram showing a controlled delay circuit to be used in the DLL circuit shown in FIG. 14.

The 8-bit pixel data D3 is input into the data conversion circuit 4, which converts data from eight bits to four bits. The 8-bit pixel data D3 is converted into 1-bit laser control signal ON by mean of a clock CK4 and a multi-phase clock k2, and the laser control signal ON is output from the data conversion circuit 4. The multi-phase clock k2 is generated by a DLL circuit shown in FIG. 14. A clock K having a period T0/4 is input into a delay circuit 12*a*. Delay circuits 12*a*, 12*b*, 12*c*, 12*d*, 12*e*, 12*f*, 12*g*, 12*h* and 12*i* all have the same structure, and each is a variable delay circuit having a delay time changeable by a control signal Vd. The delay circuits 12*a*–12*i* can severally be configured by, for example, a CMOS circuit shown in FIG. 15. Because the CMOS circuit shown in FIG. 15 is composed of differential circuits, the CMOS circuit can stably realize its high speed operation.

The output signals of the delay circuits 12*a* and 12*i* are input into a phase comparison circuit 13, and the phase comparison circuit 13 outputs an up-pulse U and a down-pulse D. The up-pulse U and the down-pulse D are input into a charge pump circuit 14. The charge pump circuit 14 generates an error signal on the basis of the up-pulse U and the down-pulse D. The error signal is input into a control signal generation circuit 15. The control signal generation circuit 15 converts the input error signal to the control signal Vd. The control signal Vd output from the control signal generation circuit 15 is input into each of the delay circuits 12*a* to 12*i*. The DLL circuit shown in FIG. 14 is controlled by the control signal Vd such that the phases of the output signals of the delay circuit 12*a* and 12*i* agree with each other. Consequently, output clocks K20, K21, K22, K23, K24, K25, K26 and K27 of the respective delay circuits 12*a*, 12*b*, 12*c*, 12*d*, 12*e*, 12*f*, 12*g* and 12*h* are the multi-phase clocks the phases of which are shifted from each other by T0/32 as shown in FIGS. 16A, 16B, 16C, 16D, 16E, 16F, 16G and 16H respectively. The clock K20 is also used as the clock CK3 of the aforementioned data conversion circuit 3.

Figures 16A, 16B, 16C, 16D, 16E, 16F, 16G, 16H, 16I, 16J, 16K, 16L, 16M, 16N, 16O:
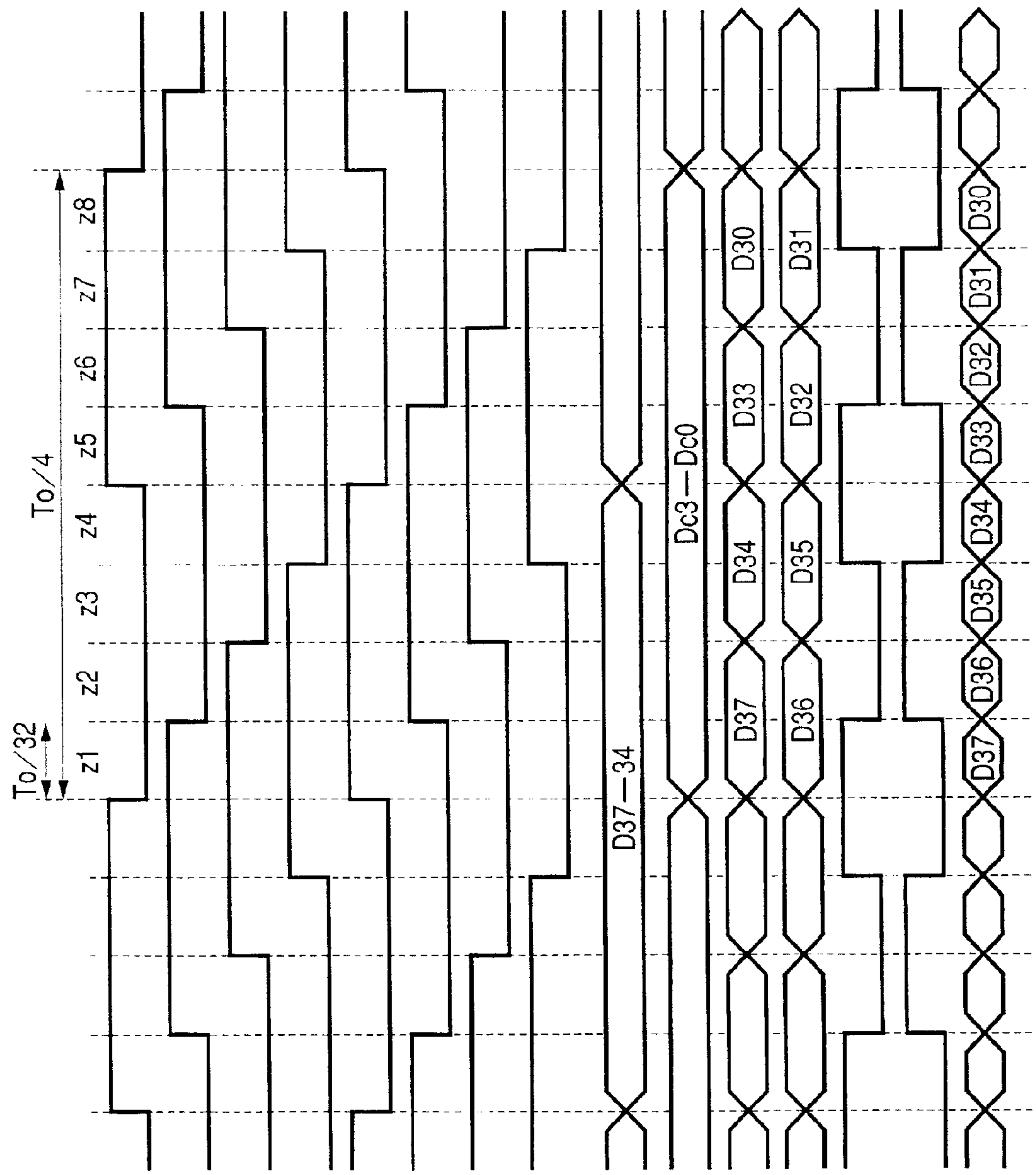
FIGS. 16A, 16B, 16C, 16D, 16E, 16F, 16G, 16H, 16I, 16J, 16K, 16L, 16M, 16N and 16O are timing charts for illustrating the operation of the data conversion circuit 4.
Figure 17:
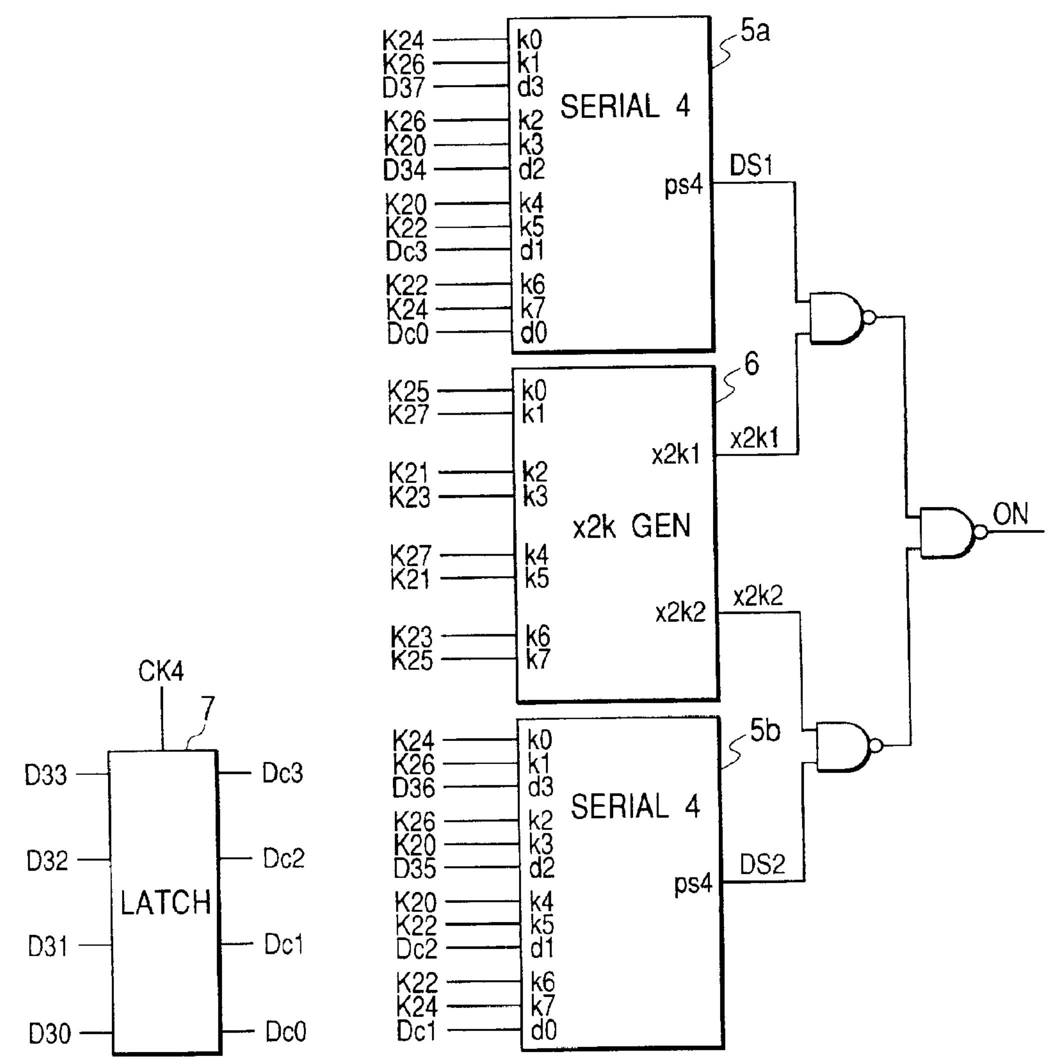
FIG. 17 is a block diagram of the data conversion circuit 4 shown in FIG. 5.

The configuration of the data conversion circuit 4 is shown in FIG. 17. Because the pixel data D3 are latched by the clock CK3 (or clock K20), the pixel data D3 is input into the data conversion circuit 4 at a timing shown in FIG. 16I. The lower four bits D33 to D30 of the pixel data D3 are latched by a latch circuit 7. If the output clock K24 is used as the clock CK4, data Dc3, Dc2, Dc1 and Dc0 of the latch circuit 7 are output as shown in FIG. 16J. The higher four bit D37 to D34 of the pixel data D3, the data Dc3 to Dc0 and clocks K20 to K27 are input into two serial conversion circuits 5*a* and 5*b* and twofold multiplied clock generating circuit 6.

It is preferable to configure the serial conversion circuits 5*a* and 5*b* in the configuration of FIG. 7, which is suitable for high speed operation. The clocks K24, K26, K26, K20, K20, K22, K22 and K24 are input into the serial conversion circuits 5*a* and 5*b* as the respective clock inputs k0, k1, k2, k3, k4, k5, k6 and k7 thereof. Moreover, the data D37, D34, Dc3 and Dc0 are input into the serial conversion circuit 5*a* as the data d3, d2, d1 and d0 thereof. The data D36, D35, Dc2 and Dc1 are input into the serial conversion circuit 5*b* as the data d3, d2, d1 and d0 thereof. Consequently, as shown in FIGS. 16K and 16L, output signals DS1 and DS2 of the serial conversion circuit 5*a* and 5*b* are respectively output as the following serially converted data. That is, the pixel data D37 and D36 are output in a region (z1+z2). The pixel data D34 and D35 are output in a region (z3+z4). The pixel data D33 and D32 are output in a region (z5+z6). The pixel data D30 and D31 are output in a region (z7+z8).

It is preferable that the configuration of the twofold multiplied clock generating circuit 6 is a configuration shown in FIG. 19 in the case where the serial conversion circuits 5*a* and 5*b* are configured as the configuration of FIG. 7. The clocks K25, K27, K21, K23, K27, K21, K23 and K25 are input into the twofold multiplied clock generating circuit 6 as the clock inputs k0, k1, k2, k3, k4, k5, k6 and k7 thereof, respectively. In this case, a twofold multiplied clock x2k1 is output as a signal shown in FIG. 16M. That is, the twofold multiplied clock x2k1 takes an L level in a region (z2+z3) and a region (z6+z7), and takes an H level in a region (z4+z5) and a region (z1+z8), as shown in FIG. 16M. On the other hand, a twofold multiplied clock x2k2 is output as a signal shown in FIG. 16N. That is, the twofold multiplied clock x2k2 takes the L level in the region (z1+z8) and the region (z4+z5), and takes the H level in the region (z2+z3) and the region (z6+z7), as shown in FIG. 16N. The output signals DS1 and DS2 and the twofold multiplied clocks x2k1 and x2k2 are input into a selection circuit composed of three two-input NAND circuit. The selection circuit outputs the laser control signal ON in the regions z1, z2, z3, z4, z5, z6, z7 and z8, which is shown in FIG. 16O and is serially converted from the pixel data D3 to D30.

The pixel modulation circuit, which is shown in FIG. 5 and is described above, can serially convert the laser control signal ON in the pixel period T0 by dividing the 32-bit pixel data D1, which have been expanded arbitrarily from the input pixel data D, into 32 parts, which is more fine in comparison with the related art, as shown in FIG. 9D. Consequently, the image processing, which is a pixel modulation technique to be used in the reproduction of a video (or gradation) image and is composed of techniques such as center pulse width modulation (PWM), left growing PWM, right growing PWM, contour processing in the reproduction of a highly fine character, and the like, can all be realized easily by the advance registration of data for the execution of the image processing in a memory in the data conversion circuit 1.

For example, a 64-word memory (or a RAM) (one word is composed of 32 bits) using the input pixel data D (composed of six bits) as address inputs is prepared as the memory in the data conversions circuit 1 for the achievement of the aforementioned image processing. Desired data conversion pattern data (composed of 32 bits) corresponding to the input pixel data D (or the address data) is previously written in this RAM.

As a method of the registration, a serial transferring method is preferable. For the serial transfer, three signal lines for the serial transferring clocks KS, the transferring serial data DS and the transferring data load signals LS are generally used. The transferring serial data DS includes an address signal corresponding to the input pixel data D, desired data conversion pattern data (composed of 32 bits) and a signal for switching over the RAM to its write mode, and the transferring serial data DS transfers the signals and the data to the RAM. When the data conversion circuit 1 receives the load signals LS, the data conversion circuit 1 begins to write the transferring serial data DS into the RAM. When the writing has finished, the RAM is switched over to its read mode. Moreover, the pulse width of the laser control signal ON can be increased T0/32 by Tp/32 from a pulse width Tw defined by the pixel data D1 to a pulse width (Tw+7T0/32) as the value of the pulse width adding data L increases, which is input into the data conversion circuit 3, from zero to seven. Moreover, the operation is not limited by the output form of the laser control signal ON. Consequently, pulses, which are shown in FIG. 18B, of the laser control signal ON can be generated with the addition of a predetermined pulse width to each of the pulses P1, P2, P3 and P4 of the conventional laser control signal ON (a state where the pulse width adding data L is 0 h) shown in FIG. 18A on the basis of the pulse width adding data L. Thereby, the light emission delay phenomenon being a fundamental characteristic of a laser diode can be cancelled equivalently. Thus, the laser emission signal that has been subjected to a desired control can easily be obtained as shown in FIG. 18C. All of the components of the pixel modulation circuits can be realized by a pure CMOS semiconductor process, which can highly integrates semiconductor elements.

Incidentally, although the descriptions concerning the aforementioned embodiment are made on the assumption that the laser beam is used as a beam for forming an image, any beam may be applied to the present invention as long as the beam can form an image.

According to the present embodiment, the input pixel data D can be expanded finely based on the pixel period, and consequently the laser control signal ON suitable for various images such as video (gradation) images, character images and the like can easily be generated.

Moreover, because a pulse width addition function for the generation of the laser control signal ON in order that a desired laser emission can be obtained from input pixel data can be realized, the modulation of the quantity of laser light more accurate than any other related art can be performed. Consequently, the high image quality can be achieved.

Moreover, because all of the components of the pixel modulation apparatus can be structured by a pure CMOS process, the pixel modulation apparatus of the present invention can be realized cheap in cost. Consequently, the pixel modulation apparatus of the present invention is advantageous to a multi-beam/multi-drum type laser beam image forming apparatus, which needs a plurality of pixel modulation apparatus.

In other words, the foregoing description of embodiments has been given for illustrative purpose only and not to be construed as imposing any limitation in every respect.

The scope of the invention is, therefore, to be determined solely by the following claims and not limited by the text of the specifications and alterations made within a scope equivalent to the scope of the claims falling within the true sprit and scope of the invention.

What is claimed is:

1. A pixel modulation apparatus for converting pixel data D composed of N1 bits input at a pixel period T0 to a pixel data signal composed of one bit, comprising:

a) a first data conversion unit which converts the pixel data D to pixel data D1 expanded to N2 bits (N2>N1) at the period T0;

b) a second data conversion unit which converts the pixel data D1 to pixel data D2 composed of N2/m bits at a period T0/m;

c) a third data conversion unit which inputs n bits from among the N2/m bits of pixel data D2 and bits of delayed pixel data Dd2 constituting pixel data D2 of a period preceding a current T0/m period to execute logical sum operations a predetermined number (equal to or less than n) of times to convert the input n bits to pixel data D3 composed of N3 bits, including additional data corresponding to the predetermined number; and d) a fourth data conversion unit which converts the pixel data D3 to the pixel data signal composed of one bit at the period T0/m.

2. An apparatus according to claim 1, wherein said first data conversion unit includes a memory which stores data for a modulation of the pixel data D with a desired pixel modulation method, and wherein said first data conversion unit inputs the pixel data D into address lines of said memory and outputs the pixel data D1 from word lines of said memory.

3. An apparatus according to claim 1, wherein said second data conversion unit and said fourth data conversion unit severally include a serial data conversion unit composed of a predetermined bits, said serial data conversion unit being configured without any flip-flop circuit.

4. An apparatus according to claim 1, said apparatus further comprising an image forming unit which forms an image by use of the pixel data signal converted by said fourth data conversion unit.

5. An apparatus according to claim 4, wherein said image forming unit forms the image with an electrophotographic process.

6. An apparatus according to claim 4, wherein said image forming apparatus forms a color image by forming images having different colors from on a plurality of photosensitive drums respectively.

7. An apparatus according to claim 6, wherein said image forming unit forms the images by irradiating two beams onto said plurality of photosensitive drums.

8. A pixel modulation method of converting pixel data D composed of N1 bits input at a pixel period T0, to a pixel data signal composed of one bit, comprising the steps of:

a) converting the pixel data D to pixel data D1 expanded to N2 bits (N2>N1) at the period T0;

b) converting the pixel data D1 to pixel data D2 composed of N2/m bits at a period T0/m;

c) inputting n bits from among the N2/m bits of pixel data D2 and bits of delayed pixel data Dd2 constituting pixel data D2 of a period preceding a current T0/m period to execute logical sum operations a predetermined number (equal to or less than n) of times to convert the input n bits to pixel data D3 composed of N3 bits, including additional data corresponding to the predetermined number; and d) converting the pixel data D3 to the pixel data signal composed of one bit at the period T0/m.

9. A method according to claim 8, said method further comprising the step of:

forming an image by use of the pixel data signal composed of one bit.

10. A method according to claim 9, wherein said forming step forms the image with an electrophotographic process.

11. A method according to claim 10, wherein said forming step forms a color image.

12. A pixel modulation apparatus for converting pixel data D composed of N1 bits input at a pixel period T0 to a pixel data signal composed of one bit, comprising:

a) a first data conversion unit which converts the pixel data D to pixel data D1 expanded to N2 bits (N2>N1) at the period T0;

b) a second data conversion unit which converts the pixel data D1 to pixel data D2 composed of N2/m bits at a period T0/m;

c) a third data conversion unit which inputs n bits from among the N2/m bits of pixel data D2 and bits of delayed pixel data Dd2 constiting pixel data D2 of a period preceding a current T0/m period to execute logical sum operations a predetermined number (equal to or less than n) of times to convert the input n bits to pixel data D3 composed of N3 bits, to which additional data corresponding to the predetermined number are added; and d) a fourth data conversion unit which converts the pixel data D3 to the pixel data signal composed of one bit at the period T0/m.

13. An apparatus according to claim 12, wherein said first data conversion unit includes memory which stores data for a modulation of the pixel data D with a desired pixel modulation method, and wherein said first data conversion unit inputs the pixel data D into address lines of said memory and outputs the pixel data D1 from word lines of said memory.

14. An apparatus according to claim 12, wherein said second data conversion unit and said fourth data conversion unit severally include a serial dta conversion unit composed of a predetermined bits, said serial data conversion unit being configured without any flip-flop circuit.

15. An apparatus according to claim 12, said apparatus further comprising an image forming unit which forms an image by use of the pixel data signal converted by said fourth data conversion unit.

* * * * *

UNITED STATES PATENT AND TRADEMARK OFFICE

CERTIFICATE OF CORRECTION

PATENT NO. : 6,963,615 B2
APPLICATION NO. : 10/117204
DATED : November 8, 2005
INVENTOR(S) : Somei Kawasaki et al.

It is certified that error appears in the above-identified patent and that said Letters Patent is hereby corrected as shown below:

COLUMN 3

Line 66, "an" should be deleted.

COLUMN 4

Line 16, "he" should read --the--.

COLUMN 6

Line 61, "D62" should read --Db2--.

COLUMN 7

Line 22, " $S3 = L2 + (L1 \mp L0)$ " should read

-- $S3 = L2 + \overline{(\overline{L1} + \overline{L0})}$ --;

Line 25, " $S5 = L2 \times (L1 \overline{\times} L0)$ " should read

-- $S5 = L2 \times \overline{(\overline{L1} \times \overline{L0})}$ --; and

Line 36, "mean" should read --means--.

COLUMN 9

Line 39, "integrates" should read --integrate--.

COLUMN 10

Line 36, "predetermined" should read --predetermined number of--.

UNITED STATES PATENT AND TRADEMARK OFFICE
CERTIFICATE OF CORRECTION

PATENT NO. : 6,963,615 B2
APPLICATION NO. : 10/117204
DATED : November 8, 2005
INVENTOR(S) : Somei Kawasaki et al.

It is certified that error appears in the above-identified patent and that said Letters Patent is hereby corrected as shown below:

COLUMN 11

Line 22, "constiting" should read --constituting--.

COLUMN 12

Line 16, "dta" should read --data--; and
Line 17, "predetemined" should read --predetermined number of--.

Signed and Sealed this

Third Day of October, 2006

JON W. DUDAS
*Director of the United States Patent and Trademark Office*